United States Patent
Abdollahian et al.

(10) Patent No.: US 12,556,929 B2
(45) Date of Patent: Feb. 17, 2026

(54) DEVICE COMMUNICATION THROUGH HIGH-FREQUENCY LIGHT ENCODING

(71) Applicant: Apple Inc., Cupertino, CA (US)

(72) Inventors: Golnaz Abdollahian, San Francisco, CA (US); Andreas I. Gal, San Mateo, CA (US); Nader W. Moussa, Issaquah, WA (US)

(73) Assignee: Apple Inc., Cupertino, CA (US)

( * ) Notice: Subject to any disclaimer, the term of this patent is extended or adjusted under 35 U.S.C. 154(b) by 459 days.

(21) Appl. No.: 18/048,394

(22) Filed: Oct. 20, 2022

(65) Prior Publication Data

US 2023/0121204 A1 Apr. 20, 2023

Related U.S. Application Data

(63) Continuation of application No. 17/149,629, filed on Jan. 14, 2021, now Pat. No. 11,483,712.

(Continued)

(51) Int. Cl.
*H04W 12/50* (2021.01)
*G06K 7/14* (2006.01)
(Continued)

(52) U.S. Cl.
CPC .......... *H04W 12/50* (2021.01); *G06K 7/1417* (2013.01); *H04B 10/502* (2013.01);
(Continued)

(58) Field of Classification Search
CPC ....... H04W 4/80; H04W 12/50; H04W 12/63; H04W 12/06; H04W 84/12; H04W 4/02;
(Continued)

(56) References Cited

U.S. PATENT DOCUMENTS 5,566,022 A * 10/1996 Segev ................ H04B 10/1149
398/118
7,689,130 B2 3/2010 Ashdown
(Continued)

FOREIGN PATENT DOCUMENTS

| CN | 109275131 A1 | 1/2019 |
| WO | 2019191222 A1 | 10/2019 |
| WO | 2020005243 A1 | 1/2020 |

OTHER PUBLICATIONS

International Patent Application No. PCT/US2021/049018—International Search Report and Written Opinion dated Dec. 10, 2021.
European Patent Application 21873180.0—Extended European Search Report dated May 10, 2024.

*Primary Examiner* — Golam Sorowar
(74) *Attorney, Agent, or Firm* — BAKERHOSTETLER; Kyle B. Morse

(57) ABSTRACT

The embodiments set forth a technique for enabling a computing device to securely communicate with a peripheral computing device. According to some embodiments, the method can include the steps of (1) receiving, at a detection sensor of the computing device, a light signal from the peripheral computing device, wherein the light signal is received at a first frequency that is higher than a second frequency capable of being detected by a camera system of the computing device, (2) extracting information from the light signal, and (3) performing an operation using the information.

39 Claims, 7 Drawing Sheets

210 – A Peripheral Computing Device 102-2 Communicates A Light Signal Encoding A Packet 212 To A Nearby Computing Device 102-1.

Related U.S. Application Data

(60) Provisional application No. 63/081,851, filed on Sep. 22, 2020.

(51) Int. Cl.
*H04B 10/50* (2013.01)
*H04W 12/037* (2021.01)
*H04W 12/108* (2021.01)
*H04W 12/65* (2021.01)

(52) U.S. Cl.
CPC ....... *H04W 12/037* (2021.01); *H04W 12/108* (2021.01); *H04W 12/65* (2021.01)

(58) Field of Classification Search
CPC ....... H04W 12/65; H04W 4/06; H04W 76/10; H04W 12/08; H04W 12/122; H04W 12/04; H04W 84/18; H04W 12/037; H04W 4/025; H04W 4/70; H04W 48/16; H04W 12/041; H04W 12/79; H04W 4/023; H04W 76/14; H04W 4/021; H04W 8/005; H04W 12/03; H04W 12/033

See application file for complete search history.

(56) References Cited

U.S. PATENT DOCUMENTS

| | | |
|---|---|---|
| 7,917,034 B2 | 3/2011 | Yu et al. |
| 8,334,898 B1 | 12/2012 | Ryan et al. |
| 10,396,894 B2 | 8/2019 | Haas et al. |
| 2010/0277075 A1 | 11/2010 | Rees |
| 2014/0281547 A1 | 9/2014 | Modzelewski et al. |
| 2016/0037290 A1* | 2/2016 | Heywood ............ H04B 10/116 398/118 |
| 2016/0156420 A1* | 6/2016 | Druml ................ H04B 10/1149 398/40 |
| 2016/0156434 A1* | 6/2016 | Liu ........................... H04L 1/08 714/748 |
| 2018/0054315 A1* | 2/2018 | Liu ....................... H04L 9/0861 |
| 2018/0337911 A1* | 11/2018 | Coggin ................... G06F 21/45 |
| 2019/0050542 A1 | 2/2019 | Armstrong et al. |
| 2021/0165480 A1 | 6/2021 | Lin et al. |
| 2021/0288716 A1* | 9/2021 | Kudchadkar ......... H04L 9/3226 |
| 2022/0078578 A1* | 3/2022 | Brumley ............... G01S 13/767 |
| 2022/0095116 A1 | 3/2022 | Abdollahian et al. |
| 2024/0323272 A1* | 9/2024 | Dhing .................... H04L 67/52 |

* cited by examiner

210 – A Peripheral Computing Device 102-2 Communicates A Light Signal Encoding A Packet 212 To A Nearby Computing Device 102-1.

220 – The Nearby Computing Device 102-1 Receives The Light Signal Including The Packet 212 And Extracts Information From The Packet Using A Decoder 220 Of The Signal Manager 110-1.

230 – The Computing Device 102-1 Performs An Operation That May Include The Peripheral Computing Device 102-2.

DEVICE COMMUNICATION THROUGH HIGH-FREQUENCY LIGHT ENCODING

CROSS-REFERENCE TO RELATED APPLICATIONS

The present application is a continuation of U.S. patent application Ser. No. 17/149,629, entitled "DEVICE COMMUNICATION THROUGH HIGH-FREQUENCY LIGHT ENCODING," filed Jan. 14, 2021, set to issue Oct. 25, 2022 as U.S. Pat. No. 11,483,712, which claims the benefit of U.S. Provisional Application No. 63/081,851, entitled "DEVICE COMMUNICATION THROUGH HIGH-FREQUENCY LIGHT ENCODING," filed Sep. 22, 2020, the contents of which are incorporated by reference herein in their entirety for all purposes.

FIELD

The described embodiments relate generally to computing devices that are configured to communicate with one another. More particularly, the described embodiments involve enabling privacy-aware, proximity-based, wireless communication between a computing device and a peripheral computing device by using a unidirectional, high-frequency light signal transmitted by the peripheral computing device and using a detection sensor of the computing device to detect the light signal.

BACKGROUND

Recent years have shown a proliferation in the average number and types of peripheral computing devices that are owned by individuals. For example, it is common for an individual to own a wearable device (e.g., fitness tracker), a pair of headphones, a set-top-box, a wireless speaker, and so on. Notably, owning these peripheral computing devices can deliver a rich user experience as each device can provide specialized functionality to meet a given user's needs throughout the day. Further, a growing number of peripheral computing devices are being enabled to be Internet of Things (IoT) devices that are capable of communicating with other computing devices. Many of these peripheral computing devices include network circuitry that enables wireless communication (e.g., via Wi-Fi or Bluetooth) with the other computing devices. However, such wireless communication may be intercepted by malicious computing devices and may compromise sensitive data of a user. In addition, many of these peripheral computing devices lack user interfaces (e.g., speakers, wearable devices, etc.) that enable a user to d determine a reason why the peripheral computing devices are not functioning properly. Moreover, the lack of user interfaces makes it difficult to efficiently establish complex configurations (e.g., Wi-Fi passwords, user account information, etc.) for the devices, e.g., when they require an "out-of-the-box" setup process. In some cases, a more advanced computing device (e.g., a smartphone, a tablet, etc.) can be utilized to pair with the peripheral computing device and assist the peripheral computing device through the setup process. Unfortunately, this approach is prone to security issues that have yet to be addressed. For example, nearby malicious computing devices can be capable of mimicking peripheral computing devices and trick users into pairing with/sending sensitive information to the malicious computing devices.

SUMMARY

To cure the foregoing deficiencies, the representative embodiments set forth herein disclose various techniques for a privacy-aware approach to enable proximity-based wireless communication between a computing device and a peripheral computing device using a unidirectional, high-frequency light signal.

According to some embodiments, a method is disclosed for enabling a computing device to securely communicate with a peripheral computing device. According to some embodiments, the method can include the steps of (1) receiving, at a detection sensor of the computing device, a light signal from the peripheral computing device, wherein the light signal is received at a first frequency that is higher than a second frequency capable of being detected by a camera system of the computing device, (2) extracting information from the light signal, and (3) performing an operation using the information.

According to some embodiments, another method is disclosed for enabling a peripheral computing device to securely communicate with a computing device. According to some embodiments, the method can include, at the peripheral computing device, the steps of (1) encoding information using an analog modulation encoding technique, (2) transmitting, to a detection sensor of the computing device, the information in a light signal at a first frequency that is higher than a second frequency capable of being detected by a camera system of the computing device, and (3) performing an operation.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
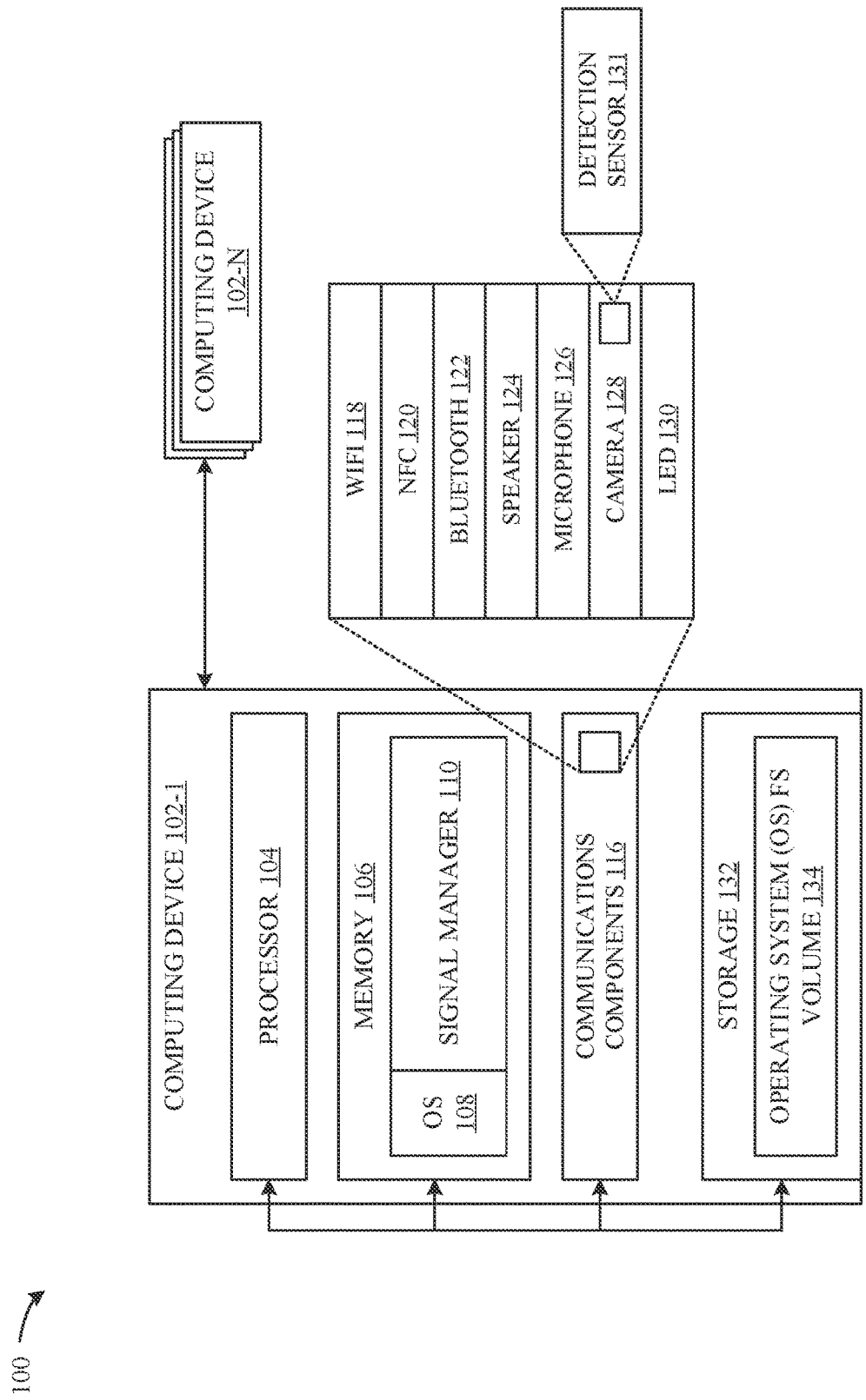
FIG. 1 illustrates a block diagram of different computing devices that can be configured to implement different aspects of the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting. It should be noted that the term "frequency" and "carrier frequency" may be used interchangeably herein.

The embodiments described herein set forth techniques for enabling privacy-aware, proximity-based, wireless communication between a computing device and a peripheral computing device by using a unidirectional, high-frequency light signal transmitted by the peripheral computing device and using a detection sensor of the computing device to detect the light signal. The light signal may be transmitted by a light source (e.g., light emitting diode (LED)) of the peripheral computing device and detected by a photodiode or other suitable detection sensor of the computing device. The computing device may be a smartphone, tablet, laptop, or the like. The peripheral computing device may be a wearable (e.g., smart watch, ear pods, etc.), an Internet of Things (IoT) device (e.g., light bulb, appliance, speaker, security system, thermostat, smoke detector, smart hub, etc.), an automobile, a machine, or any suitable device that is capable of transmitting information at a high-frequency using a light source of the device.

According to some embodiments, the communication is intended to be proximity reliant. In some embodiments, the factor that limits operation is range, e.g., the detection sensor of the computing device must be within a certain range (e.g., inches, feet, etc.) of the light source in order to receive the light signal. In some embodiments, the factor that limits operation is line-of-sight, e.g., the detection sensor and light source must have a clear pathway, free from any obstructions, (walls, obstacles, etc.), but without a specific range-limitation. The proximity-based interaction enables privacy by preventing other malicious computing devices (e.g., in a different room) from intercepting the light signal. Further, the proximity-based interaction further enhances privacy by providing a gesture of intent for the computing device to interact with the peripheral computing device by bringing the two computing devices within a certain range of each other.

The peripheral computing device may be configured to remove a direct current (DC) element from the light signal using baselining or other suitable techniques. Since the DC element is removed, the disclosed embodiments are invariant to light intensity and presence of sunlight. The bits are sent in the light signal at a frequency much higher than ambient light frequencies, therefore there may not be interference from artificial ambient lights. Accordingly, the disclosed techniques provide wireless communication that is robust to environmental factors. The bit rate also enables privacy-preservation since another device may not intercept the signal through a window or from a far distance. The light signal is short-throw that is undetectable by certain cameras included in computing devices due to the bit rate (e.g., 3200 bps) being above the sampling rate of the camera.

Various encoding/decoding methods may be used by the peripheral computing device and the computing device. The encoding/decoding methods may include time domain method, frequency shift keying, forward error correction, phase-shift, amplitude modulation, etc. For example, some embodiments may use a time domain method of encoding by transmitting 1's and 0's by switching the light source on and off at a constant frequency. In some embodiments, frequency shift keying may be used to send each bit (or symbol) at a different frequency using a light signal while maintaining a time interval per each bit (or symbol) constant.

In some embodiments, a digital packet may include a small number of bits (e.g., 36 bits (9-digit hexadecimal number)). According to some embodiments, the light signal may be unidirectional and asynchronous because the computing device may not transmit a response to the peripheral computing device. Accordingly, in some embodiments, forward error correction may be used to detect and possibly correct errors at the computing device. Additionally or alternatively, some embodiments enable a configurable retransmit variable that may be tuned by the user to enable configuring a minimum number of retransmissions are performed to ensure the digital packet arrives without wasting resources by transmitting the digital packet in the light signal too many times. In some embodiments, a frame (e.g., 10-bit frame) is transmitted by the light source to the detection sensor before transmitting the digital packet including information in order to indicate the start of the digital packet. Other packet-sizes and other frame-sizes are also possible.

According to some embodiments, the detection sensor may be a multi-purpose sensor. The detection sensor may compensate for flickers in ambient light when capturing a video and/or image using a camera of a computing device (e.g., smartphone). The detection sensor may be configured to receive the high-frequency light signal. In some embodiments, the detection sensor may be installed in a portion of the strobe or flash module of the camera system on the computing device. Alternatively, the detection sensor can be included as a general component of the computing device itself or any other component of the computing device.

As described herein, the disclosed techniques can involve utilizing the detection sensor to receive the high-frequency light signal (produced by an LED of the peripheral computing device) that is encoded with information. According to some embodiments, the detection sensor characteristics may include (i) multiple channels, defined by each channel's sensitivity to various wavelengths (colors) of light; (ii) channels that are sensitivity to invisible light, including infrared light, (iii) the simultaneous use of multiple channels for auxiliary purposes, such as to distinguish indoor and outdoor lighting conditions; (iv) the detection sensor may be further characterized by its sampling rate (e.g. 16 kHz, or 48 kHz, etc.).

The wireless communication using the high-frequency light signal may be used for a number of use cases, such as computing device pairing, dynamic Quick Response (QR) code identification, communicating a status of the peripheral device to the computing device, communicating an error or warning that helps with diagnosis of the peripheral computing device, or some combination thereof. For example, conventional warning lights are abstract. A "check engine" indicator in an automobile may indicate there is an issue with the engine but the user is not apprised of what the issue is or how to fix it. According to some embodiments, a user may bring a computing device (e.g., smartphone) within a physical range of a peripheral computing device emitting a light signal and a notification including a description of the warning and how to fix an issue associated with the warning in real-time or near real-time. Real-time or near real-time may refer to within two seconds or less.

A more detailed discussion of these techniques is set forth below and described in conjunction with FIGS. 1, 2A-2C, and 3-6, which illustrate detailed diagrams of systems and methods that can be used to implement these techniques.

FIG. 1 illustrates a block diagram 100 of different computing devices 102 that can be configured to implement various aspects of the techniques described herein, according to some embodiments. Specifically, FIG. 1 illustrates a high-level overview of a computing device 102, which, as shown, can include at least one processor 104, at least one memory 106, and at least one storage 132. According to some embodiments, the processor 104 can be configured to work in conjunction with the memory 106 and the storage 132 to enable the computing device 102 to implement the various techniques set forth in this disclosure. According to some embodiments, the storage 132 can represent a storage entity that is accessible to the computing device 102, e.g., a hard disk drive, a solid-state drive, a mass storage device, a remote storage device, a storage service, and the like. For example, the storage 132 can be configured to store an operating system (OS) file system volume 134 that can be mounted at the computing device 102, where the operating system (OS) file system volume 134 includes an OS 108 that is compatible with the computing device 102.

According to some embodiments, and as shown in FIG. 1, the OS 108 can enable a signal manager 110 to execute on the computing device 102. It will be understood that the OS 108 can also enable a variety of other processes to execute on the computing device 102, e.g., OS daemons, native OS applications, user applications, and the like. According to some embodiments, the signal manager 110 on a computing device 102 can be configured to interface with signal manager 110 executing on a peripheral computing device 102 to perform the techniques described herein.

As shown in FIG. 1, and as described in greater detail herein, the OS 108 can be configured to enable the signal manager 110 to interface with a variety of communications components 116 that are included in/accessible to the computing device 102. The communications components 116 can include, for example, a Wi-Fi interface 118, a Near Field Communication (NFC) interface 120, a Bluetooth interface 122, at least one speaker 124, at least one microphone 126, at least one camera system 128, at least one light source (e.g., light emitting diodes (LEDs), lasers, etc.)—illustrated in FIG. 1 as LED 130. The communications components 116 can further include components not illustrated in FIG. 1, e.g., a cellular interface, an Ethernet interface, display interfaces, input interfaces (e.g., buttons, touch surfaces, dials, etc.), and so on. It is noted that these examples are not meant to represent an exhaustive list in any manner, and that any form of communication interface can be included in the communications components 116. For example, the communications components 116 can include Global Positioning System (GPS) interfaces that can enable the computing devices 102 to identify when they are in proximity to one another. This can provide, for example, an additional level of security with respect to identifying when users are intending to utilize their computing devices 102 to engage in the procedures described herein with other computing devices 102.

According to some embodiments, the camera system 128 may be capable of obtaining images and/or video, e.g., using at least one lens system, at least one imaging sensor, and so on. According to some embodiments, the camera system 128 can include at least one detection sensor 131. Alternatively, and as previously described herein, the detection sensor 131 can be included as a component of the computing device 102 (or any other component/sub-component of the computing device 102) without departing from the scope of this disclosure.

According to some embodiments, the detection sensor 131 may be installed in a portion of a strobe/flash module included in the camera system 128 or may be installed in any other portion of the camera system 128. The detection sensor 131 may be partially or fully hidden or otherwise obscured from view. The detection sensor 131 may be a photodiode in one embodiment. The detection sensor 131 may be configured to prevent ambient light frequency from producing a visible artifact into an image and/or video captured by the camera system 128. According to some embodiments, the detection sensor 131 may be configured to serve multiple purposes. For example, in addition to compensating for any flickering in ambient light when capturing a video, the detection sensor 131 may be configured to receive a high frequency light signal emitted from the LED 130 of a peripheral computing device 102.

As described herein, the detection sensor 131 of the computing device 102 may be used for proximity-based interactions with the peripheral computing device 102. Using an encoded high-frequency light signal transmitted by the LED 130 of the peripheral computing device 102 and detected by the detection sensor 131, privacy of data may be maintained because of the short range transmission of the light signal and dissipation of the light signal as it travels; or by the line-of-sight path of the light signal. A distal malicious computing device may be prevented from stealing the light signal because the light signal does not travel through walls.

The detection sensor 131 may be capable of detecting light signals using at least two channels: (1) an infrared (IR) channel, and (2) an IR and visible light channel that enables differentiating indoor/outdoor settings. The detection sensor 131 may be capable of distinguishing individual colors of visible light, and may provide individual channels for each color. The detection sensor 131 may be capable of providing a sampling rate in a range of 16 kilohertz (KHz) to 48 KHz. Further, the detection sensor 131 may be capable of detecting frequencies in a range of 50 hertz to 4 KHz.

According to some embodiments, the light signal emitted by the LED 130 is undetectable by the camera system 128 because the light signal is modulated at a frequency higher than the camera system 128 is capable of detecting. The detection sensors 131 may be configured to detect the light signal because the detection sensors 131 are capable of receiving light signals at high frequencies (e.g., light signal is modulated at least with a frequency of 3200 Hz). Accordingly, the disclosed techniques enable a privacy-preserving, short-range, proximity-based wireless communication between the computing device 102 and the peripheral computing device 102. The light signal may not be readable through a window, wall, or from a far distance (e.g., meters) from the LED 130. In addition, the detection sensor 131 uses a low amount of power as compared to the camera system 128, and thus using the detection sensor 131 to receive the light signal may save the battery life of the computing device 102. The disclosed techniques do not require additional hardware to be added to peripheral computing devices 102 that already include LEDs 130.

To further enhance privacy and security, the light signal may be paired with ancillary data. For example, since the light signal does travel far, the computing device 102 has to be placed close to the peripheral computing device 102 emitting the light signal. By moving the computing device 102 close to the peripheral computing device 102, a notification may be received or generated by the computing device 102 when the light signal is received. The notification may indicate a gesture of intent was made by moving the computing device 102 close to the peripheral computing device 102. Accordingly, when the notification is received or generated, the computing device 102 may pair the notification with the light signal and present a certain user interface on the computing device based on the information extracted from the light signal. Such a technique may ensure that the user made a gesture of intent and is sufficiently close to the peripheral computing device 102 to enable security and privacy of data. Further, such a technique may prevent user interfaces from being presented inadvertently on the computing device 102 at undesired times. Presenting the user interfaces when the gesture of intent is detected may save computing resources by preventing the user interfaces from being presented when there is not a gesture of intent.

According to some embodiments, the signal manager 110 on the computing device 102 can function as a "configurator" for the signal manager 110 executing on the peripheral computing device 102, e.g., when the signal manager 110 on the peripheral computing device 102 broadcasts a setup request (via a light signal emitted from LED 130 of the peripheral computing device 102) to nearby computing devices 10. The signal manager 110 on the computing device 102 may accept the setup request. In turn, and subsequent to carrying out secure pairing techniques, the signal manager 110 (on the computing device 102) can access different information associated with the computing device 102 and transmit the information to the signal manager 110 (on the peripheral computing device 102) for installation at the peripheral computing device 102. The information can include, for example, Wi-Fi information (e.g., Service Set Identifiers (SSIDs)/passwords/encryption keys), user account information (e.g., cloud account logins/passwords/encryption keys), encryption key sets, and so on, that enables the peripheral computing device 102 to provide a rich user experience. It is noted that the foregoing examples are not meant to represent an exhaustive list in any manner, and that any form of information can be shared between the computing devices 102 as appropriate.

According to some embodiments, the signal manager 110 on the computing device 102 can function as a "scanner" by receiving a light signal from the LED 130 of the peripheral computing device 102, decoding the light signal, and identifying a Quick Response (QR) code included in a payload of the light signal. According to some embodiments, the signal manager 110 on the computing device 102 can function as a "troubleshooter" for the peripheral computing device 102. For example, the light signal may be encoded with a payload having information pertaining to a status of the peripheral computing device 102, an error or warning pertaining to the peripheral computing device 102, or some combination thereof. The LED 130 of the peripheral computing device 102 may transmit the light signal at a high frequency by flickering on and off at a high rate to transfer bits at a high rate. The light signal emitted by the peripheral computing device 102 may be received by the detection sensor 131 of the computing device 102. The signal manager 110 of the computing device 102 may decode the light signal to extract the information. In response to extracting the information, the signal manager 110 of the computing device 102 may perform an operation based on the information. The information may be presented in a user interface of the computing device 102. In some instances, the information may indicate a wireless connection link (e.g., Wi-Fi) has been disconnected and the computing device 102 may attempt to reestablish the wireless connection link for the peripheral computing device 102.

In some embodiments, the information may include a model number of the peripheral computing device 102, a protocol used by the peripheral device 102, an Internet Protocol (IP) address of the peripheral computing device 102, a unique identifier of the peripheral computing device 102, a name of the peripheral computing device 102, or the like. In some embodiments, the operation performed by the computing device 102 may be performed in conjunction with an operation performed by the peripheral computing device 102. For example, the operation may be a pairing operation in which each of the computing device 102 and the peripheral computing device 102 perform a "handshake" by exchanging information about each device with the other respective device and transmitting one or more acknowledgement messages along with a private and/or public key to the other respective device. In some embodiments, the operation performed by the computing device 102 may include setting up the peripheral computing device 102 by configuring one or more parameters of the peripheral computing device 102. In some embodiments, the operation performed by the computing device 102 may include adding the peripheral computing device 102 to a group of devices managed by a user account.

Accordingly, FIG. 1 sets forth a high-level overview of the different components/entities that can be included in each computing device 102 to enable the embodiments described herein to be properly implemented. As described in greater detail below, these components/entities can be utilized to provide privacy-aware wireless communication between a computing device 102 and a peripheral computing device 102 using high-frequency light encoding, thereby enhancing overall security.

Figure 2A:
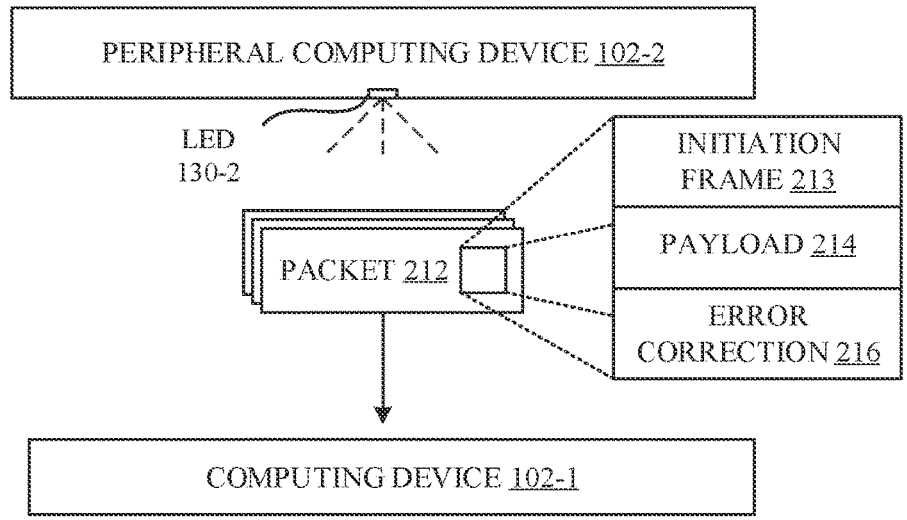
FIGS. 2A-2C illustrate conceptual diagrams of an example scenario in which a computing device and a peripheral computing device communicate through high-frequency light encoding, according to some embodiments.
Figure 2B:
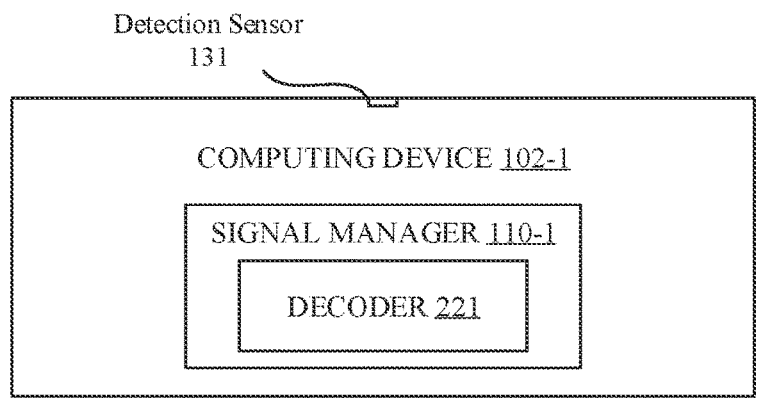
Figure 2C:
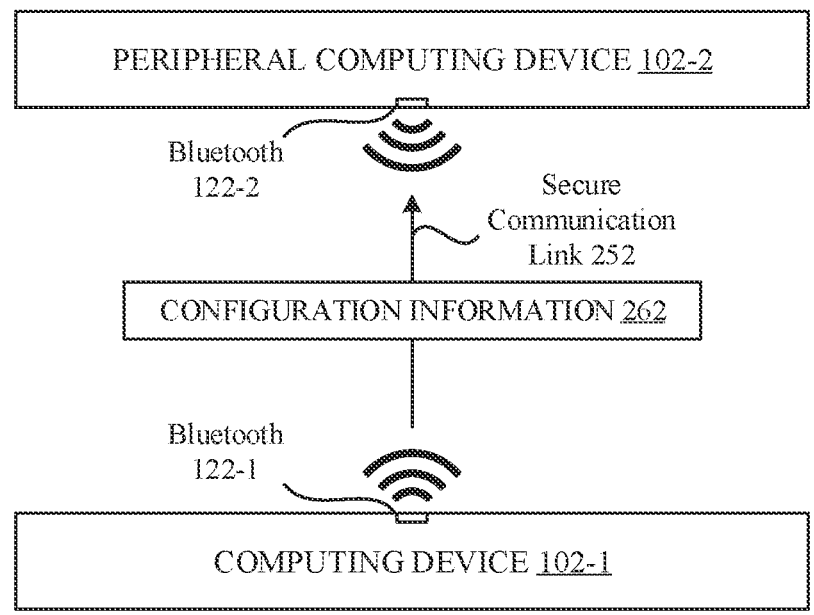

FIGS. 2A-2C illustrate conceptual diagrams of an example scenario in which a peripheral computing device 102-2 transmits a light signal to a nearby computing device 102-2 to perform an operation, according to some embodiments. According to some embodiments, the operation may include setting up the peripheral computing device 102-2, reconfiguring the peripheral computing device 102-2, establishing a new pairing with the peripheral computing device 102-2, presenting a notification (e.g., describing a type of error, status, or warning pertaining to the peripheral computing device 102-2) on a user interface of the computing device 102-1, causing a state or parameter (e.g., reestablishing a wireless communication link, restarting, freeing memory, etc.) of the peripheral computing device 102-2 to change, and so on.

As shown in FIG. 2A, a first step 210 can involve the peripheral computing device 102-2 communicating a light signal encoding a packet 212. According to some embodiments, the light signal may be encode and transmitted by the LED 130-2 of the peripheral computing device 102-2. The light signal include the packet 212 (e.g., digital packet) that is transmitted at a high frequency (e.g., at least 3200 Hz). The light signal may be encoded in such a way that the DC element is removed from the light signal. The light signal may be encoded via a time domain method where 1's and 0's are sent by switching the LED 130-2 on and off at a constant frequency. The light signal may be encoded via frequency shift keying (FSK) by sending each bit or symbol at a different frequency while maintaining a time interval per each bit or symbol constant. Further, in some embodiments, amplitude modulation may be employed when encoding the light signal.

The packet 212 may include a certain number of bits (e.g., 36 bits). Further, the packet 212 may include an initiation frame 213, a payload 214, and/or an error correction 216. The initiation frame 213 may include a certain number of bits (e.g., 10, 15, 20) in a frame that is transmitted by the LED 130 in a light signal prior to transmitting the payload 214 and/or the error correction 216. The initiation frame 213 may indicate the start of the payload 214 and/or error correction 216. In some embodiments, the payload 214 may be included in bits 0 through 31 and the error correction 216 may be included in bits after the payload. In some embodiments, the error correction 216 may be included in a same bit range as the payload 214. The payload 214 may include any suitable information, such as a message, protocol, device identifier, model number, status code, warning code, error code, programming instructions, request, or some combination thereof. The error correction 216 may include a code that enables detecting and correcting an error in the packet 212. The error correction 216 may use forward error correction (e.g., GoLay code) to provide robustness for bit-wise errors. The decoder 221 of the computing device 102-1 may receive the bits sent in the packet 212 from the light signal, determine whether there are any errors in the code sent in the packet 212, and correct and retrieve the original code included in the packet 212 (e.g., up to 3 bits error per 12 bits).

According to some embodiments, a setup mode can be advertised through packet 212 that are issued by way of the LED 130-2 included in the peripheral computing device 102-2. The payload 214 can include a device identifier (ID) (e.g., a hardware/software identifier) associated with the peripheral computing device 102-2, an indication of a setup request (e.g., a pre-defined code, message, etc.), a status code (e.g., software state, processor state, memory state, network state, etc.), error code, a warning code, etc. In this manner, the nearby computing device 102-1 can receive (e.g., using their respective detection sensors 131) for setup mode advertisements from other nearby computing devices 102, e.g., the peripheral computing device 102-2, and respond when appropriate. It is noted that the nearby computing devices 102 can be configured to receive the light signal when a gesture of intent is detected by moving the computing device 102-1 in a physical proximity to the peripheral computing device 102-2.

As shown in FIG. 2B, a step 220 can involve the computing device 102-1 receiving the light signal including the packet 212 and extracting information from the packet 212 using the decoder 221 of the signal manager 110-1. The light signal may be received at the computing device 102-1 at the detection sensor 131. The decoder 221 may decode the packet 212 based on the method used to encode the packet 212 in the light signal.

Next, at step 230 in FIG. 2C, the computing device 102-1 can perform an operation that may include the peripheral computing device 102-2. For example, if the information extracted from the light signal is a pairing request from the peripheral computing device 102-2, the pairing request may be presented on a user interface of the computing device 102-1. If the user selects an option to accept or approve the pairing request, then the computing device 102-1 may transmit an acceptance to the peripheral computing device 102-2, as well as information about the computing device 102-1 to enable the peripheral computing device 102-2 and the computing device 102-1 to be paired. In some embodiments, the operation may not include the peripheral computing device 102-2. For example, the information extracted from the light signal may include a warning that indicates the battery of the peripheral computing device 102-2 is low and that indication may be presented in a user interface on the computing device 102-1. In other words, the information extracted from the light signal may cause the computing device to perform an operation, such as presenting a notification that describes the information, without communicating back to the peripheral computing device 102-2. In some embodiments, the information extracted from the light signal may cause the computing device 102-1 to configure, setup, pair, fix, etc. a parameter or aspect of the peripheral computing device 102-2.

As depicted in the example in FIG. 2C, the information extracted from the light signal included a request from the peripheral computing device 102-2 to be configured. After receiving the light signal at the detection sensor 131, the computing device 102-1 extracts the information encoded in the light signal and performs an operation based on the request for configuration represented in the information. The computing device 102-1 may use a Bluetooth interface 122-1 to transmit configuration information 262 to the Bluetooth interface 122-2 of the peripheral computing device 102-2 over a secure communication link 252. According to some embodiments, the secure communication link 252 can be established using respective Bluetooth interfaces 122, and can be based on a password. For example, the password can function as a symmetric encryption key that can be used to form the secure communication link 252 (and to protect the various packets that are sent through the secure communication link). In another example, the password can provide a basis for establishing at least one encryption key that can be used to form the secure communication link. For example, each of the peripheral computing device 102-2 and the computing device 102-1 can access a cryptographic algorithm that processes the password 231 to derive at least one symmetric key through which the secure communication link 252 is established. In this manner, even if a malicious party in some way gains access to the password during the pairing process, they unlikely will be able to derive the at least one symmetric key through which the secure communication link 252 is established.

The configuration information 262 can include, for example, Wi-Fi information (e.g., Service Set Identifiers (SSIDs)/passwords/encryption keys), user account information (e.g., cloud account logins/passwords/encryption keys), encryption key sets, and so on, that enables the peripheral computing device 102-2 to provide a rich user experience. In turn, the peripheral computing device 102-2 can process the configuration information 262 as appropriate. For example, the peripheral computing device 102-2 can utilize Wi-Fi information included in the configuration information 262 to connect to a corresponding Wi-Fi network. In another example, the peripheral computing device 102-2 can utilize user account information included in the configuration information 262 to access data/services provided by a cloud service. In yet another example, the peripheral computing device 102-2 can utilize encryption key sets to enter into circles of trust with other computing devices 102 and provide various functionalities. It is noted that the foregoing examples are merely exemplary, and that any form of information can be included in the configuration information 262—and, further, that the peripheral computing device 102-2 can process the configuration information 262 in any appropriate manner that enables the peripheral computing device 102-2 to employ various functionalities.

Accordingly, FIGS. 2A-2C set forth conceptual diagrams of an example scenario in which the computing device 102-1 wirelessly communicates with the peripheral computing device 102-2 via a short range, proximity based, high-frequency light encoding to perform various operations, according to some embodiments. Next, FIGS. 3-5—which are described below in greater detail—provide additional high-level breakdowns of the techniques described herein.

Figure 3:
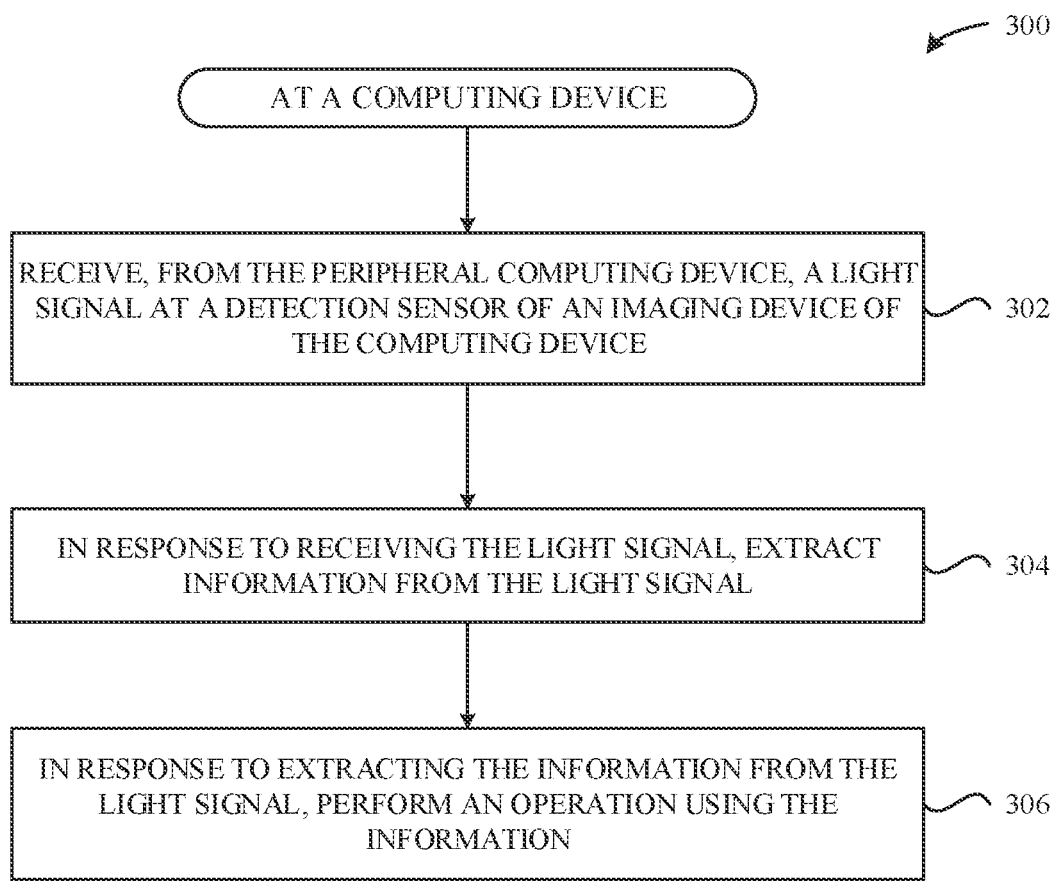
FIG. 3 illustrates a method for enabling a computing device to securely communicate with a peripheral computing device, according to some embodiments.

FIG. 3 illustrates a method 300 for enabling a computing device 102 (e.g., a computing device 102-1) to securely communicate with a peripheral computing device 102 (e.g., a peripheral computing device 102-2), according to some embodiments. The method may be implemented by instructions stored on a memory device of the computing device 102-1 and executed by a processing device communicatively coupled to the memory device.

As shown, the method 300 begins at step 302, where the computing device 102-1 receives, from the peripheral computing device 102-2, a light signal at the detection sensor 131 (e.g., as described above in conjunction with FIGS. 2A-2B). The light signal may be received at a first frequency that is higher than a second frequency capable of being detected by the camera system 128. For example, in some embodiments, the received light signal may be modulated with a frequency of at least 3200 Hz, which may be above a maximum frequency (e.g., second frequency) at which the camera system 128 is capable of receiving or detecting a signal. In some embodiments, the first frequency is within a range of 50 Hz to 4 KHz. In some embodiments, the first frequency may be within any suitable range that is capable of being detected by the detection sensor 131 but not by the camera system 128. In some embodiments, the light signal is produced by at least one light source (LED 130) included on the peripheral computing device 102-2. Further, the light signal may be received as an asymmetric, unidirectional communication from the peripheral computing device 102-1.

In some embodiments, the detection sensor 131 may be used by the computing device 102-1 to filter ambient light from interfering with data captured by the camera system 128. As such, the detection sensor 131 may serve multiple technical purposes.

At step 304, in response to receiving the light signal, the computing device 102-1 extracts information from the light signal (e.g., as described above in conjunction with FIG. 2B). The information may include any suitable information such as a model number of the peripheral computing device 102-2, a name of the peripheral computing device 102-2, an IP address of the peripheral computing device 102-2, a protocol used by the of the peripheral computing device 102-2 to send a status code, error code, warning code, etc., a message (e.g., an error code, a status code, a warning code, etc.), programming instructions, a request, or the like. In some embodiments, the information may include an identifier of a protocol and a code (e.g., error code) defined by the protocol, and the computing device 102-1 may determine, based on the protocol and the code, the operation to perform. For example, the computing device 102-1 may use a lookup table stored in a database to identify the protocol with the identifier and translate the code by identifying a corresponding error description to the code. In some embodiments, the information may include programming instructions that are executed by the computing device 102-1 to perform one or more operations. The programming instructions may be implemented by an executable or a script.

The information may be encoded, by the peripheral computing device 102-2, in a digital packet in the light signal using an analog modulation encoding technique such as time domain, frequency shift keying, or some combination thereof. Further, the information may be encoded in the digital packet using amplitude modulation, forward error correction coding, or some combination thereof. As such, the digital packet may include a section for error correction to be used by the computing device 102-1 to correct any errors detected in the information included in the digital packet. In some embodiments, the digital packet may encode the information in a payload represented in bits 0 through 31. However, any suitable number of bits may be used in the digital packet that are capable of performing the techniques described herein. The information may be extracted by the computing device 102-1 performing decoding on the light signal.

In some embodiments, the computing device 102-1 may receive, concurrently with the light signal, a second light signal at the second frequency, where the second frequency is human-perceptible. That is, the light source may generate and transmit two light signals at the same time. One light signal may be transmitted at a first signal that is not human-perceptible at the same time as a second signal that is human perceptible. The second signal may enable a user to determine there is an issue with the peripheral computing device 102-2 or the peripheral computing device 102-2 is attempting to communicate and cause a user to bring the computing device 102-1 within a physical proximity to the peripheral computing device 102-2 to receive the first light signal at the first signal that is not human-perceptible.

At step 306, in response to extracting the information from the light signal, the computing device 102-1 performs an operation using the information (e.g., as described above in conjunction with FIG. 2C). The operation may include pairing the computing device 102-1 and the peripheral computing device 102-2, identifying a QR code, identifying a status of the peripheral computing device 102-2 (wireless connection lost, an amount of processing, memory, battery usage or level remaining, etc.), detecting an error or warning (e.g., the peripheral computing device 102-2 is overheating), or some combination thereof.

According to some embodiments, prior to receiving the light signal, the computing device 102-1 may receive (or generate) a notification pertaining to the operation. The notification may represent a gesture of intent that is triggered based on the computing device being moved within a physical proximity to the peripheral computing device 102-2. The computing device 102-1 may determine whether the notification and the light signal are received within a threshold period of time (e.g., concurrently, contemporaneously, simultaneously, within less than a 1 second, 2 seconds, etc.). The threshold period of time may be configured and may be used to further ensure the gesture of intent and the light signal are received around the same time period to enhance security and privacy. In response to determining the notification and the light signal are received within the threshold period of time, the computing device 102-1 may pair the notification and the light signal. In response to the pairing, the computing device 102-1 may present, on the computing device 102-1, the notification pertaining the information. In some embodiments, the notification may include a description of the operation to be performed and provide an option to approve the performance of the operation. In some embodiments, the computing device 102-1 may receive a selection of an option to approve the performance of the operation. In some embodiments, in response to receiving the selection of the option to approve the performance of the operation, the computing device 102-1 may indicate an approval of the operation to the peripheral computing device 102-2. For example, the operation may include a pairing process between the computing device 102-1 and the peripheral computing device 102-2 and the light signal may include a request from the peripheral computing device 102-2 to pair with the computing device 102-1.

It is noted that additional steps can be implemented in association with the foregoing techniques to enable extended functionalities of the computing device 102-1 communicating with the peripheral computing device 102-2.

Consider, for example, a scenario in which the peripheral computing device 102-2 is an audio component that is configured to playback audio from a variety of sources (e.g., music services, paired devices, etc.). In this scenario, the method 300 can further involve prompting the user (of the computing device 102-1) for login information associated with music services with which the user is registered. Additionally, the computing device 102-1 can provide trial offers for different online services that are available and relevant to the computing device 102-1/peripheral computing device 102-2—especially when the user is unable to provide the aforementioned logins for music services. For example, the computing device 102-1 can identify a type of the peripheral computing device 102-2, and, in turn, interface with an online service to identify any free trials that are available in association with purchasing the peripheral computing device 102-2.

In some cases, the computing device 102-1 can be designed to participate as a component within a smart home environment. In this scenario, the computing device 102-1 can prompt the user about different smart home configuration settings that should be applied to the peripheral computing device 102-2. For example, the computing device 102-1 can be configured to (1) present at least one home (e.g., "Cupertino Home") that was previously set up by the user, (2) present the option to create (i.e., establish) at least one home when no homes have been set up by the user, and so on. In any case, when the user selects a home, the computing device 102-1 can be configured to (1) present at least one room (e.g., "Living Room") that was previously set up by the user, (2) present the option to create (i.e., establish) at least one room when no rooms have been set up (e.g., within the selected home) by the user, and so on. It is noted that the foregoing examples are exemplary, and that any smart home properties can be assigned to the peripheral computing device 102-1 during the operations or procedures described herein. For example, the peripheral computing device 102-2 can be configured to participate as an individual speaker within a particular group of speakers (e.g., belonging to a house and/or room). In another example, the peripheral computing device 102-2 can be configured to function as one of two speakers in a stereo configuration, or one of many speakers in a surround sound configuration. In yet another example, the speaker can be configured to function as a single speaker that typically roams throughout a particular home.

Accordingly, FIG. 3 sets forth a method for enabling a computing device 102 to engage in a secure wireless communication, using high-frequency light encoding, with a peripheral computing device 102. Beneficially, the operations provided herein can range from simple scenarios (e.g., sharing Wi-Fi information, presenting errors, statuses, warnings, etc.) to more complex scenarios (e.g., smart home configurations). In any case, the computing devices 102 described herein can be configured to provide user interfaces that guide users through the various operations that are associated with peripheral computing devices 102. In turn, the peripheral computing devices 102 can be configured to interface with and provide various levels of feedback (e.g., operability indications, confirmation indications, etc.), the details of which are described below in conjunction with FIG. 4.

Figure 4:
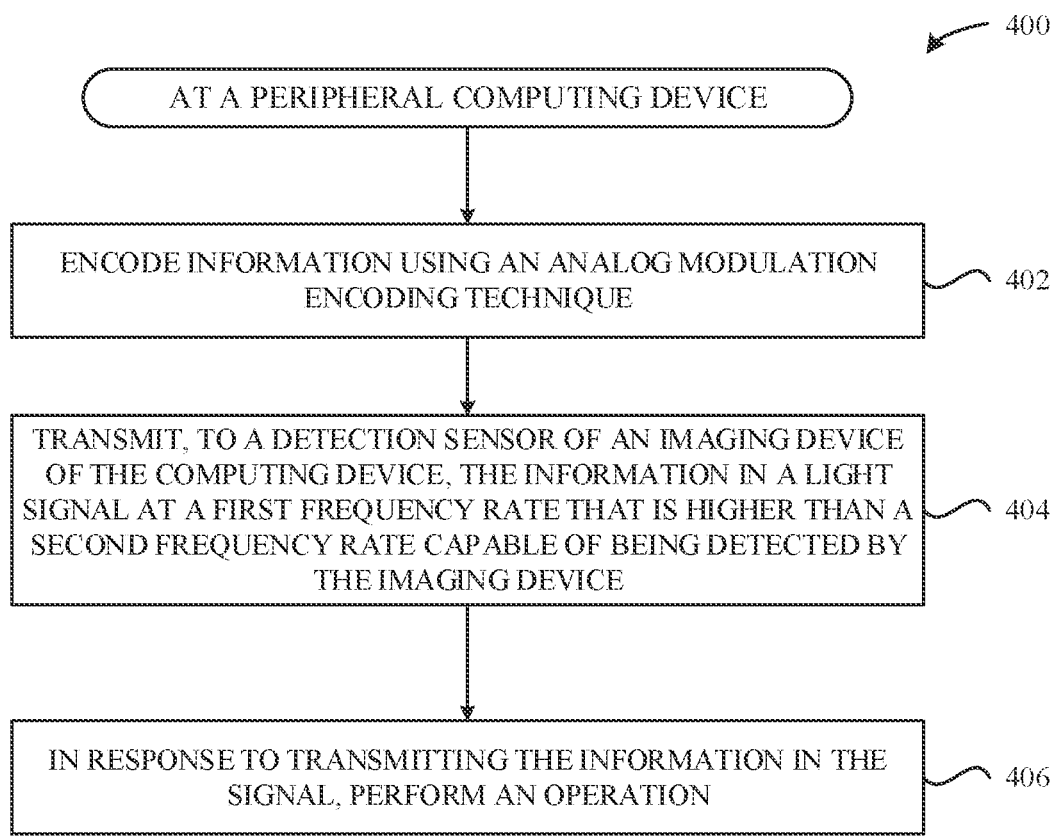
FIG. 4 illustrates a method for enabling a peripheral computing device to securely communicate with a computing device, according to some embodiments.

FIG. 4 illustrates a method 400 for conducting a setup procedure at a peripheral computing device 102 (e.g., a peripheral computing device 102-1), according to some embodiments. The method may be implemented by instructions stored on a memory device of the peripheral computing device 102-2 and executed by a processing device communicatively coupled to the memory device.

As shown, the method 400 begins at step 402, where the peripheral computing device 102-2 encodes information using an analog modulation encoding technique (e.g., time domain, phase shift keying, etc.). At step 404, the peripheral computing device 102-2 transmits, to the detection sensor 131 of the computing device 102-1, the information in a light signal at a first frequency that is higher than a second frequency capable of being detected by the camera system 128. The information may include a model number of the peripheral computing device 102-2, a name of the peripheral computing device 102-2, an IP address of the peripheral computing device 102-2, a request to pair the peripheral computing device 102-2 with the computing device 102-1, a protocol used by the peripheral computing device 102-2, a Quick Response (QR) code, a status of the peripheral computing device 102-2, an error or warning associated with the peripheral computing device 102-2, or some combination thereof. At step 406, in response to transmitting the information in the light signal, the peripheral computing device 102-2 may perform an operation, as described herein.

Figure 5:
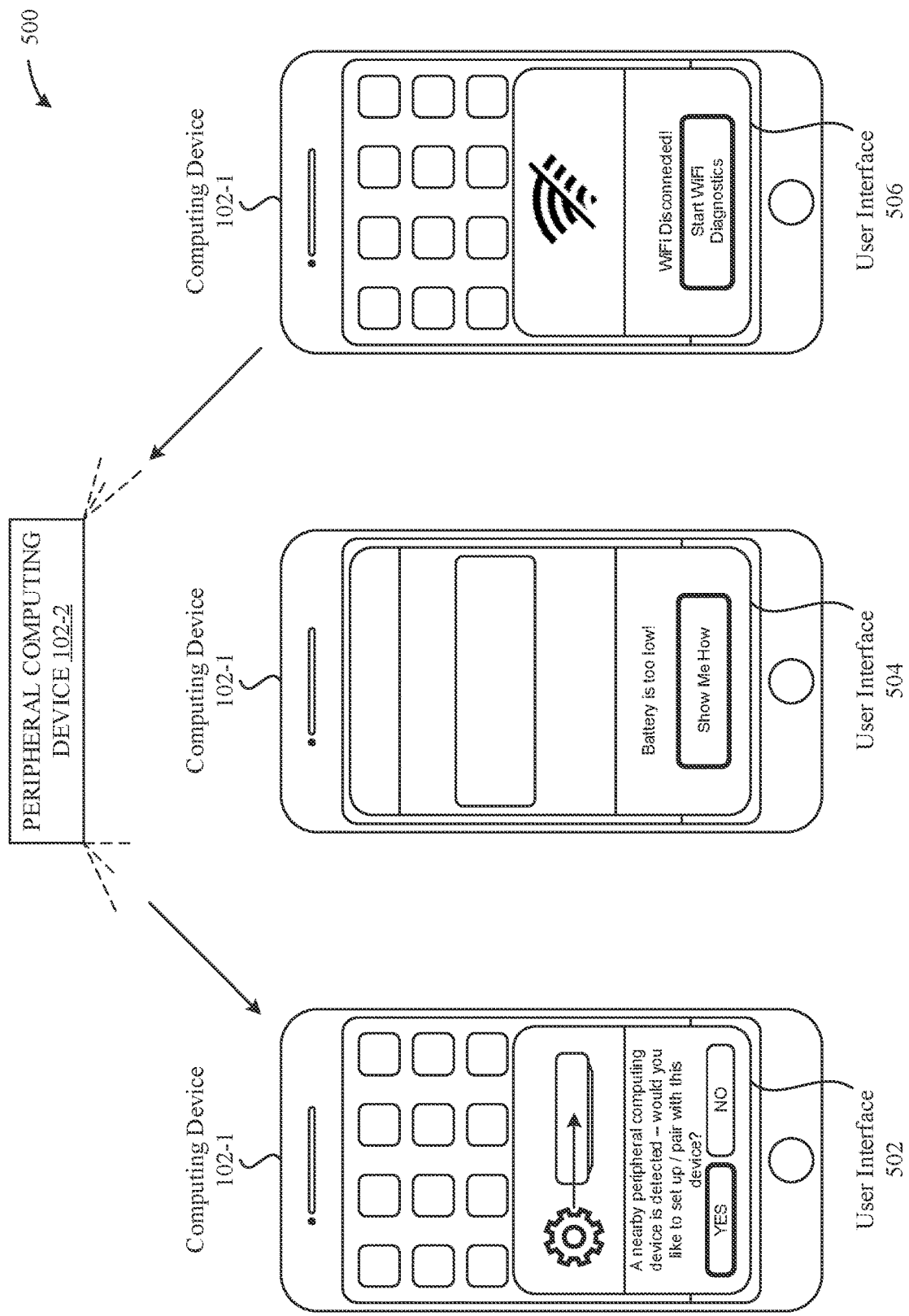
FIG. 5 illustrates a conceptual diagram of example user interfaces that can be implemented at a computing device that participates in wireless communication with a peripheral computing device, according to some embodiments.

Additionally, FIG. 5 illustrates a conceptual diagram 500 of example user interfaces that can be implemented at a computing device (e.g., the computing device 102-1) that participates in secure and privacy-protected wireless communication with a peripheral computing device 102 (e.g., the peripheral computing device 102-2), according to some embodiments. The user interfaces may be presented when a gesture of intent is detected. The gesture of intent may be determined by the user moving the computing device 102-1 within a physical proximity of the peripheral computing device 102-2. As shown in FIG. 5, the computing device 102-1— specifically, a signal manager 110-1 executing on the computing device 102-1—can receive, via the detection sensor 131, a light signal from the peripheral computing device 102-2. In turn, the computing device 102-2 can extract information from the light signal and perform an operation. Depending on the information included in the light signal, the signal manager 110-1 may perform a certain operation.

In one example, where the information includes a setup request, the operation may include presenting a user interface 502 that notifies a user of the computing device 102-1 about the setup request being issued by peripheral computing device 102-2. For example, the user interface 502 can include images, animations, sounds, etc., that draw attention to the computing device 102-1 and prompt the user as to whether he or she would like to utilize the computing device 102-1 to pair with/set up the peripheral computing device 102-2. As shown in FIG. 5, the user interface 502 can include a visual representation of the peripheral computing device 102-2, e.g., based on a device ID that is transmitted by the peripheral computing device 102-2 (e.g., as described above in conjunction with FIG. 2A). Additionally, as shown in the user interface 502 (and in accordance with the examiner scenario illustrated in FIG. 5), the user accepts the prompt, which causes the computing device 102-1 to transmit a message (e.g., via Bluetooth or Wi-Fi) to the peripheral computing device 102-2. The information may indicate an acceptance to pair and/or include information that completes the pairing or setup.

As shown in FIG. 5, another example user interface 504 may be presented based on the information in the light signal. The user interface 504 can present a warning that the "Battery is too low!". Such a warning may be included as a code in the information of the light signal along with a protocol that defines the code. The computing device 102-1 may determine what the code means using the protocol and present the information on the user interface 504. Further, a graphical icon is presented on the user interface 504, where the graphical icon enables a user to select an option to receive further information pertaining to the warning. In this example, the information may describe how the user can properly charge the peripheral computing device 102-2.

As shown in FIG. 5, another example user interface 506 may be presented based on the information in the light signal. The user interface 506 can present an error or status that the "Battery is too low!". Such an error or status may be included as a code in the information of the light signal along with a protocol that defines the code. The computing device 102-1 may determine what the code means using the protocol and present the information on the user interface 506. Further, a graphical icon is presented on the user interface 506, where the graphical icon enables a user to select an option to perform an operation pertaining to the error or status. In this example, the selecting option may cause the computing device 102-1 to start diagnosing the cause of the Wi-Fi disconnection.

Accordingly, FIG. 5 illustrates the manner in which the embodiments described herein can provide a highly effective and efficient approach for determining a user's intent to engage his or her peripheral computing device 102-2 when a computing device 102-1 is located within a physical proximity to the peripheral computing device 102-2 that is transmitting a light signal encoded at a high-frequency.

Additionally, it is noted that the embodiments set forth herein can be modified to employ different approaches to achieve the same or similar results without departing from the scope of this disclosure. For example, an audio signal or other suitable signal may be used to transmit information to the computing device 102-1. In another example, the computing device 102-1 can be configured to disregard any audio signals produced by the peripheral computing device 102-2 when receiving the light signal. Larger sampling rate, symbol rate, bit rate, and packet encoding size, can be employed.

The light signals can employ any analog encoding scheme to effectively communicate the information. In turn, the computing device 102-1 can obtain the light signals and extract the information from the light signals in accordance with the encoding scheme that is utilized. According to some embodiments, an initial handshake can be performed between the peripheral computing device 102-2 and the computing device 102-1, whereupon an indication of the encoding scheme to be utilized is communicated. In this regard, the encoding scheme can be dynamically changed to help increase security and thwart malicious activities.

Additionally, it is noted that the light signals described herein can encompass any form of a visual pattern animation that is displayed on a display device. For example, the peripheral computing device 102-2 can include a display device (e.g., an integrated liquid crystal display (LCD) screen, an organic light emitting diode (OLED) screen, etc.)—or communicate with an external display device (e.g., a television)—that is capable of displaying an animation into which information can be encoded. For example, when audio signals are employed (and encode information), the animation can coincide with timing information included in the audio signal. In another example, when audio signals are not employed—or when they do not play an integral role in the pairing process—the animation itself can encode information. In any case, the computing device 102-1 can be configured to obtain and process the animations (alone or in combination with the audio signals) to effectively perform the techniques described herein. Again, is noted that the foregoing examples are not in any way meant to represent an exhaustive list of the different approaches that can be used. Additionally, it is noted that the techniques associated with these examples can be combined/modified in any manner without departing from the scope of this disclosure.

Additionally, it is noted that the techniques described herein can include an out-of-band verification of the authenticity of the peripheral computing device 102-2. This can involve, for example, the computing device 102-1 facilitating communications between the peripheral computing device 102-2 and a server device (e.g., managed by a manufacturer of the peripheral computing device 102-2 or a partner of the manufacturer) to enable the server device/computing device 102-1 to confirm that the peripheral computing device 102-2 is authentic. For example, the server device can issue encryption-based challenges to the peripheral computing device 102-2 that presumably can only be correctly answered by the peripheral computing device 102-2. Moreover, the peripheral computing device 102-2 can provide identifier information, encryption key information, etc., as an indication of the authenticity of the peripheral computing device 102-2. In turn, the server device can indicate to the computing device 102-1 as to whether a pairing process should be carried out, thereby substantially enhancing security. Additionally, it is noted that the peripheral computing device 102-2 can employ similar techniques to verify the authenticity of the computing device 102-1 to reduce the likelihood of engaging in a malicious pairing. For example, the peripheral computing device 102-2 can issue challenges (e.g., as described above) to the computing device 102-1 to verify authenticity. Moreover, if an internet connection is available to the peripheral computing device 102-2, the peripheral computing device 102-2 can communicate with the server device to perform additional levels of verification of the computing device 102-1.

Figure 6:
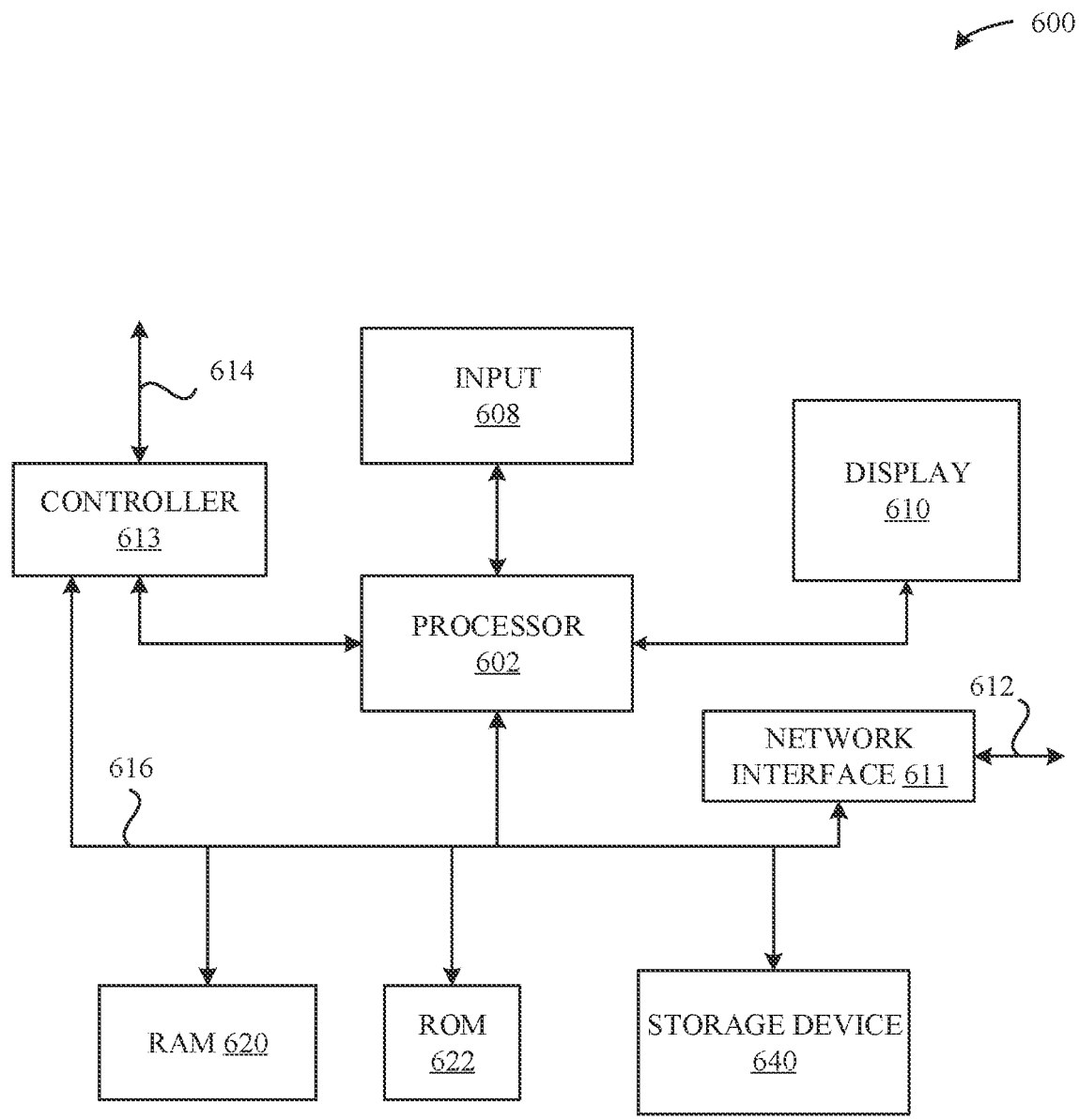
FIG. 6 illustrates a detailed view of a computing device that can represent the computing devices of FIG. 1 used to implement the various techniques described herein, according to some embodiments.

FIG. 6 illustrates a detailed view of a computing device 600 that can represent the computing devices of FIG. 1 used to implement the various techniques described herein, according to some embodiments. For example, the detailed view illustrates various components that can be included in the computing devices 102 described in conjunction with FIG. 1. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 that can be controlled by the processor 602 (e.g., via a graphics component) to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

As noted above, the computing device 600 also includes the storage device 640, which can comprise a single disk or a collection of disks (e.g., hard drives). In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of applications executing on the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a computing device to securely communicate with a peripheral computing device, the method comprising, at the computing device:
   receiving a notification from peripheral computing device;
   receiving a light signal from the peripheral computing device; and
   in response to determining, based on receiving the notification, that the computing device and the peripheral computing device satisfy a physical proximity to one another:
      extracting, from the light signal, information including one or more characters corresponding to the peripheral computing device, wherein the one or more characters represent a respective status of the peripheral computing device;
      in accordance with a determination that the one or more characters correspond to a first operation, performing the first operation, wherein the determination that the one or more characters correspond to the first operation includes a determination that the respective status is a first status; and
      in accordance with a determination that the one or more characters correspond to a second operation, performing the second operation different from the first operation, wherein the determination that the one or more characters correspond to the second operation includes a determination that the respective status is a second status, and wherein the second status is different from the first status.

2. The method of claim 1, further comprising, prior to performing the first operation:
   displaying an option to approve the first operation, and
   while displaying the option to approve the first option, receiving a selection of the option, wherein the first operation is performed in response to receiving the selection of the option.

3. The method of claim 2, further comprising, in response to receiving the selection of the option:
   indicating an approval of the first operation to the peripheral computing device.

4. The method of claim 1, wherein:
   the information is encoded in a digital packet in the light signal using an analog modulation encoding technique comprising time domain, frequency shift keying, or some combination thereof, and
   the digital packet includes a section for error correction.

5. The method of claim 1, wherein the first operation comprises:
   pairing the computing device and the peripheral computing device,
   identifying a Quick Response (QR) code,
   identifying a status of the peripheral computing device,
   detecting an error or warning, or
   some combination thereof.

6. The method of claim 1, wherein the light signal is produced by at least one light source included on the peripheral computing device.

7. The method of claim 1, wherein performing the first operation includes displaying a first user interface, and wherein performing the second operation includes displaying a second user interface different from the first user interface.

8. The method of claim 1, wherein the light signal is received at a detection sensor of the computing device at a first frequency that is higher than a second frequency capable of being detected by a camera system of the computing device, and the method further comprises:
   utilizing the detection sensor to prevent ambient light from interfering with data captured by the camera system.

9. The method of claim 1, wherein performing the first operation includes displaying a first content, and wherein performing the second operation includes displaying second content different from the first content.

10. The method of claim 1, wherein performing the first operation includes attempting to reestablish a wireless connection link with the peripheral computing device.

11. The method of claim 1, further comprising:
   receiving a selection of a variable parameter that configures a number of times the light signal is retransmitted by the peripheral computing device.

12. The method of claim 1, wherein the light signal is received as an asymmetric, unidirectional communication from the peripheral computing device.

13. The method of claim 1, wherein the information comprises an identifier of a protocol and a code defined by the protocol, and the method further comprises:
determining, based on the protocol and the code, the first operation.

14. A computing device configured to securely communicate with a peripheral computing device, the computing device comprising at least one processor configured to cause the computing device to carry out steps that include:
receiving a notification from peripheral computing device;
receiving a light signal from the peripheral computing device; and
in response to determining, based on receiving the notification, that the computing device and the peripheral computing device satisfy a physical proximity to one another:
extracting, from the light signal, information including one or more characters corresponding to the peripheral computing device, wherein the one or more characters represent a respective status of the peripheral computing device;
in accordance with a determination that the one or more characters correspond to a first operation, performing the first operation, wherein the determination that the one or more characters correspond to the first operation includes a determination that the respective status is a first status; and
in accordance with a determination that the one or more characters correspond to a second operation, performing the second operation different from the first operation, wherein the determination that the one or more characters correspond to the second operation includes a determination that the respective status is a second status, and wherein the second status is different from the first status.

15. The computing device of claim 14, wherein the steps further include, prior to performing the first operation:
displaying an option to approve the first operation, and
while displaying the option to approve the first option, receiving a selection of the option, wherein the first operation is performed in response to receiving the selection of the option.

16. The computing device of claim 15, wherein the steps further include, in response to receiving the selection of the option:
indicating an approval of the first operation to the peripheral computing device.

17. The computing device of claim 14, wherein:
the information is encoded in a digital packet in the light signal using an analog modulation encoding technique comprising time domain, frequency shift keying, or some combination thereof, and
the digital packet includes a section for error correction.

18. The computing device of claim 14, wherein the first operation comprises:
pairing the computing device and the peripheral computing device,
identifying a Quick Response (QR) code,
identifying a status of the peripheral computing device,
detecting an error or warning, or
some combination thereof.

19. The computing device of claim 14, wherein the light signal is produced by at least one light source included on the peripheral computing device.

20. The computing device of claim 14, wherein performing the first operation includes displaying a first user interface, and wherein performing the second operation includes displaying a second user interface different from the first user interface.

21. The computing device of claim 14, wherein the light signal is received at a detection sensor of the computing device at a first frequency that is higher than a second frequency capable of being detected by a camera system of the computing device, and wherein the steps further include:
utilizing the detection sensor to prevent ambient light from interfering with data captured by the camera system.

22. The computing device of claim 14, wherein performing the first operation includes displaying a first content, and wherein performing the second operation includes displaying second content different from the first content.

23. The computing device of claim 14, wherein performing the first operation includes attempting to reestablish a wireless connection link with the peripheral computing device.

24. The computing device of claim 14, wherein the steps further include:
receiving a selection of a variable parameter that configures a number of times the light signal is retransmitted by the peripheral computing device.

25. The computing device of claim 14, wherein the light signal is received as an asymmetric, unidirectional communication from the peripheral computing device.

26. The computing device of claim 14, wherein the information comprises an identifier of a protocol and a code defined by the protocol, and wherein the steps further include:
determining, based on the protocol and the code, the first operation.

27. A non-transitory computer readable storage medium configured to store instructions that, when executed by a processor included in a computing device, cause the computing device to carry out steps that include:
receiving a notification from peripheral computing device;
receiving a light signal from the peripheral computing device; and
in response to determining, based on receiving the notification, that the computing device and the peripheral computing device satisfy a physical proximity to one another:
extracting, from the light signal, information including one or more characters corresponding to the peripheral computing device, wherein the one or more characters represent a respective status of the peripheral computing device;
in accordance with a determination that the one or more characters correspond to a first operation, performing the first operation, wherein the determination that the one or more characters correspond to the first operation includes a determination that the respective status is a first status; and
in accordance with a determination that the one or more characters correspond to a second operation, performing the second operation different from the first operation, wherein the determination that the one or more characters correspond to the second operation includes a determination that the respective status is a second status, and wherein the second status is different from the first status.

28. The non-transitory computer readable storage medium of claim 27, wherein the steps further include, prior to performing the first operation:
displaying an option to approve the first operation, and
while displaying the option to approve the first option, receiving a selection of the option, wherein the first operation is performed in response to receiving the selection of the option.

29. The non-transitory computer readable storage medium of claim 28, wherein the steps further include, in response to receiving the selection of the option:
indicating an approval of the first operation to the peripheral computing device.

30. The non-transitory computer readable storage medium of claim 27, wherein:
the information is encoded in a digital packet in the light signal using an analog modulation encoding technique comprising time domain, frequency shift keying, or some combination thereof, and
the digital packet includes a section for error correction.

31. The non-transitory computer readable storage medium of claim 27, wherein the first operation comprises:
pairing the computing device and the peripheral computing device,
identifying a Quick Response (QR) code,
identifying a status of the peripheral computing device,
detecting an error or warning, or
some combination thereof.

32. The non-transitory computer readable storage medium of claim 27, wherein the light signal is produced by at least one light source included on the peripheral computing device.

33. The non-transitory computer readable storage medium of claim 27, wherein performing the first operation includes displaying a first user interface, and wherein performing the second operation includes displaying a second user interface different from the first user interface.

34. The non-transitory computer readable storage medium of claim 27, wherein the light signal is received at a detection sensor of the computing device at a first frequency that is higher than a second frequency capable of being detected by a camera system of the computing device, and wherein the steps further include:
utilizing the detection sensor to prevent ambient light from interfering with data captured by the camera system.

35. The non-transitory computer readable storage medium of claim 27, wherein performing the first operation includes displaying a first content, and wherein performing the second operation includes displaying second content different from the first content.

36. The non-transitory computer readable storage medium of claim 27, wherein performing the first operation includes attempting to reestablish a wireless connection link with the peripheral computing device.

37. The non-transitory computer readable storage medium of claim 27, wherein the steps further include:
receiving a selection of a variable parameter that configures a number of times the light signal is retransmitted by the peripheral computing device.

38. The non-transitory computer readable storage medium of claim 27, wherein the light signal is received as an asymmetric, unidirectional communication from the peripheral computing device.

39. The non-transitory computer readable storage medium of claim 27, wherein the information comprises an identifier of a protocol and a code defined by the protocol, and wherein the steps further include:
determining, based on the protocol and the code, the first operation.

* * * * *